May 1, 1956          G. H. MOFFETT          2,743,625
POWER TRANSMISSION MECHANISM
Filed May 17, 1955          4 Sheets-Sheet 1
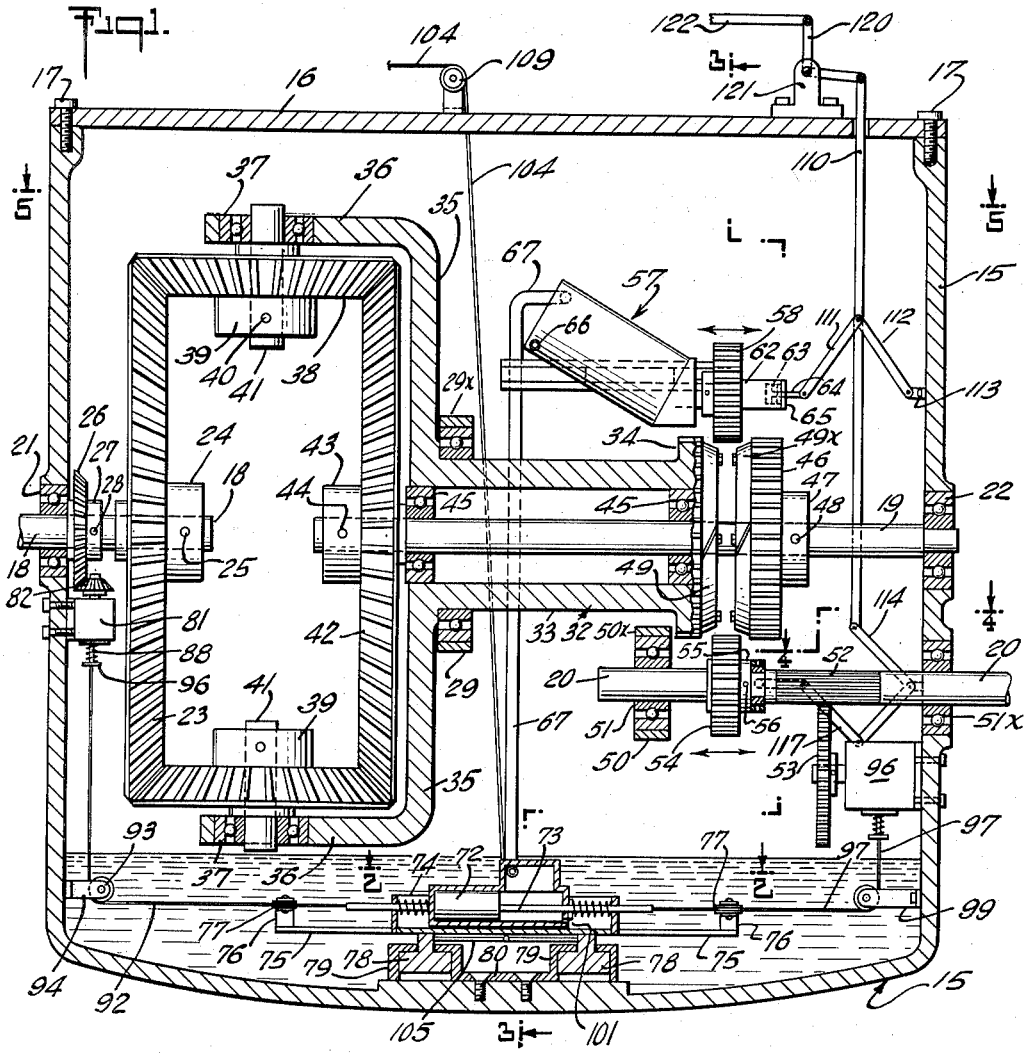
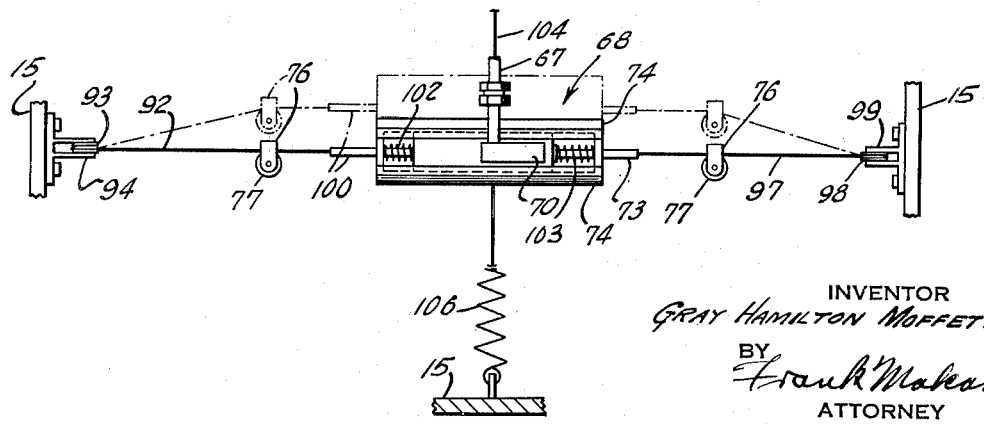
INVENTOR
GRAY HAMILTON MOFFETT
BY
Frank Makara
ATTORNEY May 1, 1956 G. H. MOFFETT 2,743,625
POWER TRANSMISSION MECHANISM
Filed May 17, 1955 4 Sheets-Sheet 2
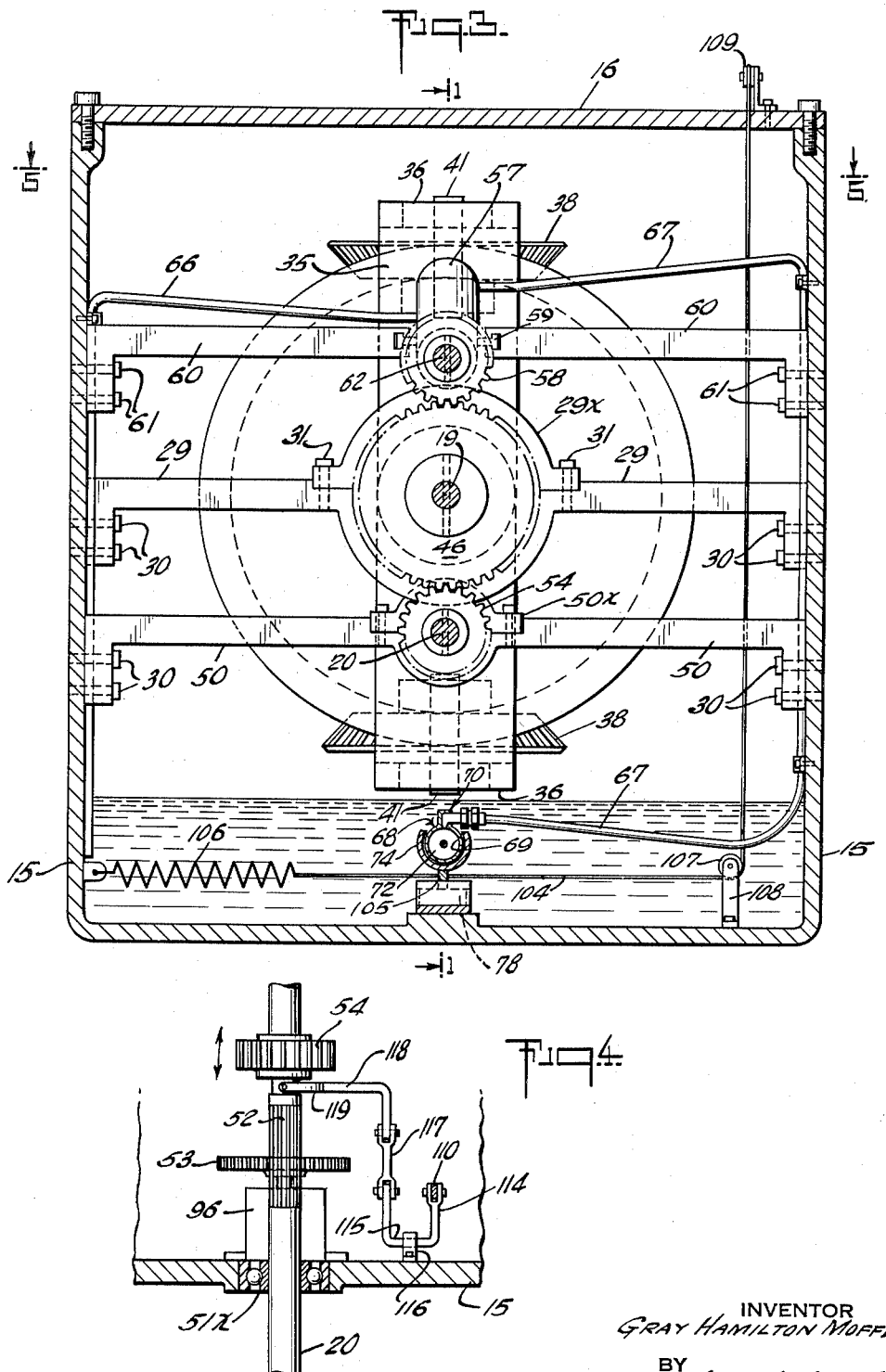
INVENTOR
GRAY HAMILTON MOFFETT
BY
Frank Mahan
ATTORNEY

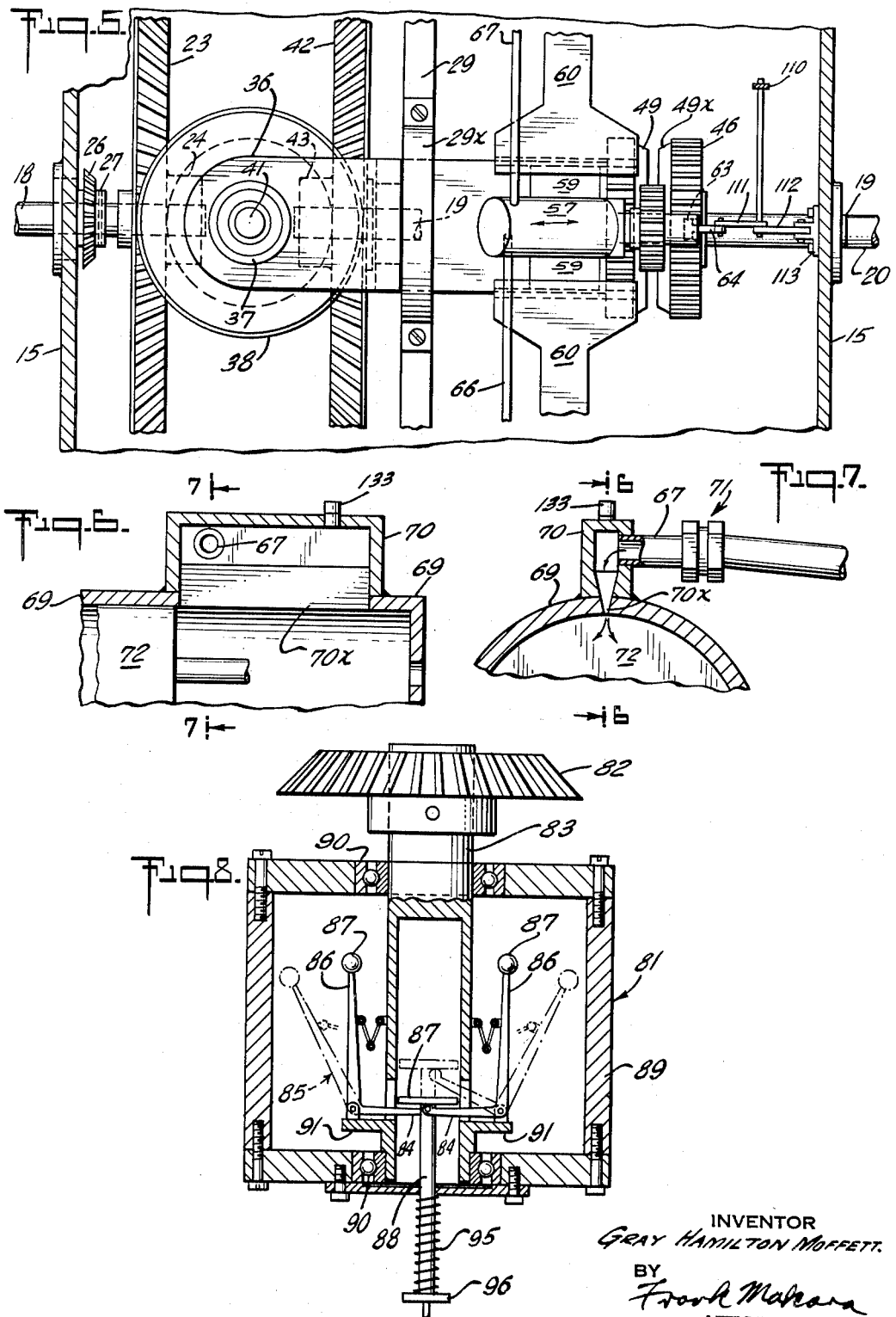

May 1, 1956
G. H. MOFFETT
2,743,625
POWER TRANSMISSION MECHANISM
Filed May 17, 1955
4 Sheets-Sheet 4
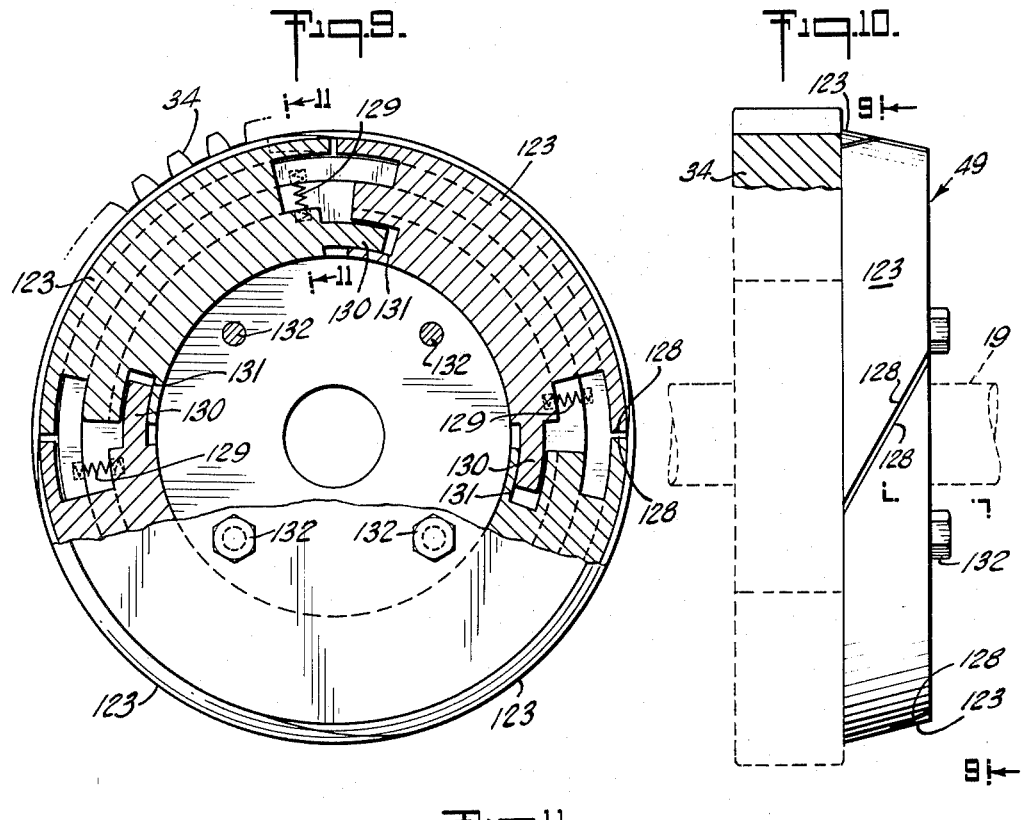
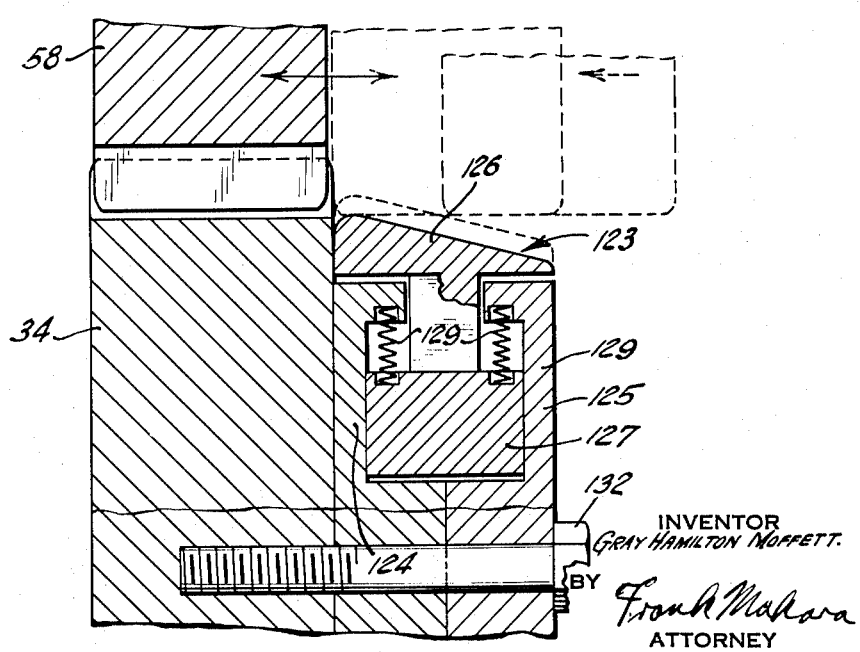
INVENTOR
GRAY HAMILTON MOFFETT.
BY
Frank Mahara
ATTORNEY

United States Patent Office 2,743,625
Patented May 1, 1956

2,743,625

POWER TRANSMISSION MECHANISM

Gray Hamilton Moffett, North Bellmore, N. Y.

Application May 17, 1955, Serial No. 508,918

6 Claims. (Cl. 74—752)

This invention relates to a power transmission device.

An objective of this invention is to provide a power transmission device of inexpensive construction.

Another objective is to provide a transmission device adapted to efficiently transmit power from a driver shaft to a driven shaft with a minimum loss of power therebetween.

These and other objectives of this invention will become apparent upon reading the following descriptive disclosure taken in conjunction with the accompanying drawing in which:

Fig. 1 is a longitudinal section of the transmission assembly disposed in a housing having a quantity of oil therein, Fig. 2 is a view of the oil valve showing in dotted outline the valve disposed in a transversely disposed position to effect selective closure of the valve part, Fig. 3 is a view taken on line 3—3 of Fig. 1 and showing the manner of supporting the gears in the housing, Fig. 4 is a view taken on line 4—4 of Fig. 1 and showing the manner of spline engagement of the driven shaft, Fig. 5 is a view taken on line 5—5 of Fig. 1 showing an oil pump and gear assembly adapted to effect transmission of power, Fig. 6 is a sectional longitudinal view taken through the oil port, Fig. 7 is a transverse section view of the oil valve port showing an inlet conduit from the oil pump secured to the valve chamber, Fig. 8 is a section view taken through a governor assembly, Fig. 9 is a section view, broken away in part, showing the internal construction of a synchronizing drum, Fig. 10 is a section view showing the manner of bolting a synchronizing drum to a co-acting gear, and Fig. 11 is a detailed view taken on line 11—11 of Fig. 9 and showing in dotted outline the manner of meshing the oil pump gear to another gear by means of the synchronizing drum.

Referring to the drawing and particularly to Figs. 1 to 3, a transmission rectangular casing 15 is provided with a cover plate 16 secured removeably thereto by screws 17.

The front of the casing 15 is provided with an aperture for a driver shaft 18 driven for example by a conventional internal combustion engine (not shown).

The rear of the casing 15 is provided with a pair of spaced apart apertures one for the auxiliary driver shaft 19 and the other for the principal driver shaft 20. Driver shaft 18 is disposed in a conventional thrust bearing 21 disposed in the front wall of the casing 15 while the auxiliary driver shaft 19 is disposed in a conventional thrust bearing 22 disposed in the rear casing wall.

A front vertically disposed beveled planetary gear 23 is provided with an integral collar 24 and is secured to driver shaft 18 by a conventional securing key 25.

Intermediate the front planetary gear 23 and the front wall of casing 15, a governor drive gear 26 having an integral collar 27 is disposed on shaft 18 and secured thereto by conventional set screw 28.

Intermediate the front and the rear wall of the casing 15, a curvatured support bridge piece 29 (Fig. 3) is disposed and secured to the respective casing side walls by threaded screws 30. A co-acting semi-circular securing piece 29X is secured to the bridge piece 29 by conventional bolts 31.

A planetary carriage 32 having a tubular section 33 is provided at its rear with integral gear teeth 34 and at its front with a pair of integral vertically disposed and opposed spaced-apart support arms or carrier 35 secured integrally in turn to respective horizontally disposed carriage arms 36.

The carriage arms 36 are provided with apertures in which suitable bearings 37 are disposed.

A pair of horizontally disposed planetary bevel gears 38 having an integral collar 39 are secured by a set screw 40 to a respective short shaft 41, a part of each of said shafts being disposed in a respective bearing 37.

A rear vertically disposed planetary gear 42 is provided with an integral collar 43 and secured to auxiliary driver shaft 19 by a set screw 44.

The shaft 19 is disposed interiorly of and through the tubular section 33 of the planetary carriage 32 and supported within said carriage by a pair of spaced-apart ball bearings 45.

The vertically disposed planetary bevel gears 23 and 42 are of the same diametrical size and the shafts 18 and 19 to which the gears are respectively secured are disposed in linear relationship. Similarly the horizontally disposed pair of planetary bevel gears 38 are of equal diameter and are disposed on linearly disposed shafts. The gears 23, 42 and 38 are caused to mesh in a planetary manner so that rotation of vertical gear 23 may effect rotation of both of the horizontal gears 38 which latter in turn may rotate rear vertical gear 42. Also whenever the carriage 42 is free to rotate, it too may rotate freely.

A gear 46 is provided with collar 47 and secured to shaft 19 at selected position intermediate the carriage gear 34 and the rear wall of casing 15 by means of a set screw 48.

The carriage gear 34 and the auxiliary shaft gear 46 are positioned a suitable distance from one another, and their opposing face are provided with moveably secured synchronizing drums 49 and 49X to be described in detail hereinafter.

A second curvatured bridge support piece 50 (Fig. 3) similar to bridge piece 29 is suitably disposed beneath bridge piece 29 and secured by bolts 30 to the casing 15 side walls and to a semi-circular bridge piece 50X by bolts 31. A ball bearing unit 51 is disposed removeably between section 50 and 50X.

The driven shaft 20 is disposed at the end within the casing 15 in said bearing 51X and is provided with spline longitudinal gears 52 in a selected peripheral section of said shaft for sliding contact with a rear governor gear 53 to be described hereinafter.

The shaft 20 is further provided with a motivating gear 54 having a collar 55 and secured to shaft 20 in front of spline gear 52 by set screw 56. Gear 54 is so positioned and secured to shaft 20 that in neutral position its gear teeth touch neither the synchronizing drum 49 of carriage gear 34 nor the synchronizing drum 49X of gear 46.

In order to transmit power smoothly and efficiently to driven shaft 20 from driver shaft 18, an oil pump of conventional make, for example, a Vicker's oil pump 57 is employed.

The oil pump is motivated selectively by moving an oil pump actuating gear 58 into engagement for example, with gear 34.

As shown in Figs. 3 and 5 the gear oil pump 57 is provided with a pair of horizontally and oppositely disposed T-bars 59 secured integrally as by welding to the casing of the conventional oil pump 57. The T-arms of the respective bars 59 are disposed slideably in co-acting grooves disposed in a pair of oppositely disposed shelf arms 60 secured respectively to the side walls of the casing 15 by screws 61.

The oil hydraulic pump 57 is provided with a motivating axle 62 upon which gear 58 is removeably secured as by a set screw disposed in a collar integral with said gear 58. The axle 62 is provided with a cavitated end to permit a rotational grasping of a conventional socket 63 disposed on link 64, said socket being secured in said axle cavity by a conventional screw threaded cap secured to correspondingly threaded end of axle 62. The oil pump 57 with its fixed axle 62 may be pushed to the front of the casing or pulled to the rear of the casing while operating.

As shown in Fig. 3, the oil is lead into the oil pump 57 through a conduit 66 and pumped out of the pump 57 through conduit 67 into an oil valve 68.

The oil valve 68 comprises a cylindrical casing 69 closed at both ends, with a rectangular dome 70 at its top. A narrow slot 70X is disposed through the casing 69 wall beneath the dome 70 (Fig. 7). Oil pump outlet conduit 70 is secured to the dome 70, preferably through a coupling 71, so that the oil from the hydraulic pump 57 is pumped into the chamber of dome 70 and through the slot 70X.

The length of the slot opening is alterable by a piston 72 disposed in the casing 69. The piston 72 may be moved over the slot opening by pulling the piston 72 to the rear (Fig. 1).

The casing 69 is provided in its rear cylindrical wall with an aperture to permit piston rod 73 to pass therethrough and is further provided with an outlet port to permit pumped oil to flow from casing 69.

The casing 69 is disposed securingly in a longitudinal cup shaped trough 74 having flat extension arms 75 on each side to which are secured spool supports 76 having horizontally disposed grooved spools 77 thereon.

The trough element 74 is secured at its bottom to a pair of spaced-apart depending T-bars 78 disposed transversely relative to the oil valve 68. The T-bars 78 are disposed in corresponding guideways 79 of an element 80 secured by conventional screws to the casing 15.

A front governor 81 having a motivating gear 82 is secured to the front casing 15 wall by conventional metal bolts. Gear 82 meshes with gear 26 (Fig. 1) on shaft 18.

As shown in Fig. 8, the governor 81 consists of a rotating shaft 83 rotated by gear 82 removably fixed thereto. The shaft 83 is hollow at its lower end (Fig. 8) and is provided with a pair of spaced-apart apertures through which an arm 84 of a bell-crank lever 85 is respectively disposed. The other arm 86 of the bell-crank 85 is provided with a conventional ball weight 87 so that rotation of shaft 83 causes the balls 87 to move outwardly due to centrifugal force.

The lever arms 84 are provided with round ends adapted to frictionally engage the head 88 of a lift pin 88 disposed in the cavity of shaft 83. The arms 86 of lever 85 are secured to the exterior of shaft 83 by means of conventional V-shaped extension arms 89 which limit the outward travel of arms 86.

The governor ball mechanism is enclosed in a housing 89X having shaft bearings 90. As shown in Fig. 8 the elbows of the bell-crank 85 preferably rest on a platform 91.

Rotation of shaft 83 causes the balls 87 and arms 86 to move outwardly to the position shown in dotted outline (Fig. 8) which causes the lever arms 84 to raise the lift pin head 87 to the position shown in dotted outline. This upper movement into the cavity of shaft 83 causes the lift pin 88 to pull wire cable 92.

Wire cable 92 is secured at its other end to the front end oil valve casing 69, so that upward movement of cable 92 toward governor 81 causes oil valve casing 69 to move toward the front wall of transmission casing 15. To facilitate smooth transfer of cable force to oil valve casing 69, the cable 92 is disposed about a conventional grooved pulley 93 secured to a bracket 94 which latter is secured to the front wall casing 15. The lift pin 82 is provided with a coil spring 95 disposed about the pin between a pin base 96 and the governor casing 89 causing return of the lever arms 86 back to their normal position upon cessation of rotation of shaft 83.

A second governor 96 of similar construction as governor 81 is actuated by gear 53 which latter gear is actuated by spline gear 52. A wire cable 97 leads from governor 96 around a grooved spool pulley 98 which is secured to a bracket 99 fixed to the near casing 15 wall.

The wire cable 97 is disposed around pulley wheel 98 at a right angle thereabout and thence to the rod 73 secured to the oil valve piston 72. The wire cable 92 from governor 81 is secured similarly to a rod 100 which later is secured as by welding to the front end wall of casing 69.

Thus moveable casing 69 is provided with a front end wall to which rod 100 is attached and a rear end wall having an oil exhaust aperture 101 and a central aperture through which piston rod 73 moves. The casing itself is securely and captively disposed in a fixed cradle 74 which is provided with a front wall through which rod 100 moves and a gear wall through which rod 73 moves.

The rod 100 is provided with a coil spring 102 disposed between the front wall of cradle 74 and the front wall of casing 69. Similarly the rod 73 is provided with a coil spring 103 between the rear wall of cradle 74 and the rear wall of casing 69.

It is thus apparent that actuation of governor 81 pulls the casing 69 toward the front wall of the transmission casing 15, i. e. toward pulley wheel 93, while actuation of governor 96 pulls the piston 72 out of the casing 69 and over the valve slot 70X, i. e. toward pulley wheel 98 or the rear wall of the transmission casing 15. Moreover, simultaneous actuation of both governors 81 and 96 causes the casing 69 to move to the left (Fig. 1) whereas the piston 72 is moved simultaneously to the right (Fig. 1) thereby effecting a relatively rapid closure of the slot 70X in casing 69 by the piston 72.

To effect a manual and selective closure of the valve slot 70X a wire cable 104 (Fig. 3) is secured to crossbar 105 which bar 105 is secured to the pair of T-shaped slide bars 78. The opposed side of the cross-bar 105 (Fig. 3) is secured to a return coil spring 106 secured to the adjacent casing 15 wall.

The wire cable 104 is disposed parallel to the bottom of the transmission casing 15 by means of a fixed pulley wheel 107 secured to a bracket 108 which latter is secured to the casing 15. The cable 104 is given a 90 degree turn about wheel 107 and disposed upwardly through an aperture in the transmission cover plate 16.

Preferably the cable 104 is disposed over another pulley 109 located on cover plate 16 and thence leads to a dashboard (not shown). A pull on the cross-bar 105 causes the entire cradle 74 to move toward pulley 107 to the dotted position shown in Fig. 2. The casing 69 is slidably mounted in cradle 74 so that the movement of the cradle 74 causes a movement of both casing 69 and piston 72 thereby effecting a closure of the oil slot 70X in casing 69 by piston 72 by the lateral wire cables 92 and 97 which are of fixed length and disposed about the respective guide wheels 77.

Release of the manual pulling force on cable 104 causes spring 106 to return the cradle 74 and hence the casing 69 slidably disposed therein as well as the piston 72 within casing 69 slowly to its normal position (Fig. 2).

An important feature of this invention is the provision of a synchronizing drum 49 to carriage gear 34 and also a like drum 49X to gear 46 disposed on shaft 19.

The purpose of the synchronizing drums 49 and 49X is to permit meshing of oil pump gear 58 and driver shaft gear 54 with a rotating or stationary gear 34 or 46 as the case may be.

In other words, for example, the synchronizing drum 49 fixedly disposed on rotating gear 34 will bring up the speed of gear 58 to that of gear 34 immediately prior to effecting meshing of gears 34 and 58, thereby avoiding clashing or even stripping of gear teeth.

The oil pump gear 58 is moved selectively simultaneously but opposite in direction to driver gear 54. To effect this simultaneous but opposite directional movement of gears 58 and 54 a linkage system is employed.

This linkage system may be manually operated and comprises of a vertical master link 110 to which a V-flexible arm linkage assembly consisting of arms 111 and 112 is secured. The arm 112 is hingedly secured to a stud 113 secured to the side wall of casing 15 whereas arm 111 is hingedly secured to the socket arm 64 which latter is provided with a retaining socket 63 captively held in a cavity of shaft 62 by a cap 63 disposed over the shaft end and through which cap 63 and rod 64 passes.

The master link 110 is hingedly secured at its depending terminus with a bell crank 114 which preferably has its arms spaced apart by an integral bridge piece 115. The bridge piece 115 is secured by a clamp 116 to the casing wall 15 (Fig. 4). A secondary link 117 is secured to the end of the lower arm of bell crank 114 and this link 117 is in turn linked to a right-angle throw arm 118 having a bifurcated claw 119 disposed in a co-acting groove on driver shaft 20. Thus the gear 54 whether rotating or stationary may be brought into selective engagement with a rotating or stationary gear 34 or 46 as the case may be.

It will be apparent from the linkage arrangement described above that downward movement of master link 110 causes oil pump gear 58 to move leftwardly (Fig. 1) to engage the carriage gear 34 and simultaneously causes the driver shaft 20 to move to the right (Fig. 1) causing driver shaft gear 54 to engage gear 46.

The link 110 is disposed in an aperture in cover plate 16 (Fig. 1) and may be secured to a right angle rocker arm 120 secured to an upright support 121. A link 122 leads to the operator of the mechanism.

Turning now to the synchronizing drum 49 (Figs. 9 to 11), the drum itself is made of 4 like quadrant interlocked sections 123 disposed captively in a pair of suitably grooved co-acting lock plates 124 and 125.

The quadrant sections 123 comprise a beveled top section 126 having an integral T-shaped depending section 127. The top edges of the respective quadrants 123 are provided with oblique edges 128 to permit sliding movement of a gear tooth of gear 58 over the line of juncture between two adjacent quadrants.

The T-shaped sections 126 of the quadrants 123 are provided with cavities to receive an end of coil springs 129. Similarly the groove for holding the T-section captively is provided with co-acting cavities to receive the other end of coil springs 129.

The T-shaped locking sections 127 are provided at one end with a locking tongue 130 which tongue slidingly mates in a suitably prepared groove 131 in the adjacent quadrant section. Thus each quadrant is provided at one end with a tongue 130 and at the other end with a groove 131 adapted to receive slidingly a like tongue of the adjacent quadrant.

The quadrant sections are secured to the lock plates by the T-section thereof being captively held in the prepared grooves therein, said plates being bolted to gear 34 by a plurality of bolts 132.

As can be seen in Fig. 11, rotation of the gear 34 causes centrifugal force to compress the coil springs 129 thereby causing the quadrant sections to move outwardly to the dotted line position. Upon slowing down of gear 34 the coil springs 129 return the quadrant sections to their normal position. This outward movement of all four quadrants is gradual as the speed of the gear 34 increases and is a smooth movement because of the sliding contact of tongues 130 with the respective surfaces of the co-acting channeled cavities 131.

In effecting a meshing of, for example, stationary gear 58 with rotating gear 34, the gear 58 is moved leftwardly by link 64 until the teeth thereof engage the beveled smooth surface of the quadrant sections of rotating synchronizing drum 49.

This contact causes the gear 58 to revolve and as gear 58 is moved more leftward against the pressure of springs 129 the contact is more forceful so that gear 58 assumes the peripheral speed of drum 49 (see dotted outline of successive gear teeth steps in Fig. 11). After the gear teeth of gear 58 have depressed the quadrant sections 123 against their springs 129, the gear 58 is rotating with the peripheral speed of the teeth of gear 34. At this point further leftward movement of gear 58 intermeshes the running gear teeth of gear 58 with the running gear teeth of gear 34. Simultaneously and identically gear 54 is intermeshed with gear 46.

In the operation of the transmission device of this invention an idle motor would turn shaft 18 and carriage shaft 32 and auxiliary driver shaft 19. To effect rotation of driver shaft 20, the master link is manually pushed down forcing gear 58 to mesh with gear 34 and gear 54 to mesh with gear 46. The rotation of gear 34 pumps oil into the chamber oil valve dome 70. Simultaneously governor 96 is actuated pulling piston 72 over the slot opening 70X thereby closing the opening causing the pump 57 to pump against increasing resistance. This increased resistance causes carriage gear 34 to slow down and then to come to a rest. Meanwhile, the power from shaft 18 is transmitted through planetary gears 23, 38 and 42 to shaft 19 and thus to gear 46 and gear 54 intermeshed therewith. Rotation of gear 54 rotates shaft 20 so that the power of driver shaft 18 is thus transmitted substantially without power loss to driven shaft 20 and thence to for example, the differential assembly of an automobile.

It is therefore apparent that transmission of power by the device of this invention is smooth and efficient.

While this invention has been described in detail by means of an illustrative embodiment, clearly other variations of this embodiment will now become apparent to those skilled in this art, but all these apparent variations are embraced within the scope of the claims herein.

In the preferred embodiment of this invention, driven shaft gear 54 is wider than oil pump gear 58. As a result, gear 54 will effect engagement with its mating gear 34 or 47 prior to the engagement of gear 58 with its mating of the respective gear 47 or 34, thereby preventing clashing of the gears during the meshing operation.

Furthermore, the high pressure side of the oil pumps is provided with a convential relief valve 133 preferably attached to the oil valve dome 70, to prevent rupture of the high pressure mechanism in the event of excessive pressure.

I claim:

1. A transmission device for transmitting power from a driver shaft to a driven shaft comprising, a transmission housing having an oil reservoir, a planetary gear train having a front and rear spaced-apart vertically disposed bevel gear said rear gear being actuated from said front gear by a pair of spaced-apart horizontally disposed bevel gears, a driver shaft secured to said front vertical gear and disposed through the front wall of the transmission housing, an auxiliary driven shaft secured to the rear vertical gear and journaled in the rear wall of said housing, a tubular carrier having bifurcated arms secured to said horizontally disposed bevel gears and having an integral gear at the end of the tube, said auxiliary shaft being disposed through said tubular carrier, a gear secured to said auxiliary shaft in spaced relation to said carriage gear, a synchronizing drum secured to both the carrier gear and to the auxiliary shaft gear, hydraulic gear pump means having a gear adapted to selectively engage said carrier gear and said auxiliary shaft gear, a driven shaft having a spline gear in its periphery, a driven shaft gear secured to the driven shaft and adapted to engage selectively said carrier gear and said auxiliary shaft gear, linkage means for simultaneously and selectively engaging said oil pump gear and said driven shaft gear to respectively said carrier gear and said auxiliary shaft gear, and oil valve means for restricting automatically pumped oil from said hydraulic gear pump.

2. The device of claim 1 wherein said linkage means consists of a master link having a link thereon secured to said hydraulic pump for moving said pump and also having a bottom linkage adapted to engage said driven shaft to move said driven shaft simultaneously but in opposed directions to the movement of said hydraulic pump.

3. The apparatus of claim 1 wherein the oil valve means for automatically restricting the output flow from the hydraulic pump comprises a movable oil valve casing having an outlet aperture and having a dome having a slot thereunder, a piston moveably disposed in said valve casing and adapted to cutoff said slot opening, an inlet conduit means secured to said casing dome and to said hydraulic pump for transmitting pumped oil into said dome, and automatic means for moving said casing and said piston.

4. The device of claim 3 wherein the automatic means for closure of said oil valve slot comprise a first front governor, a gear means securing said first governor to said driver shaft, cable means securing said first governor to said casing for moving said casing relative to the governor speed, a second rear governor, gear means securing the spline gear of the driver shaft to said second governor, cable means securing said second governor to said piston for moving said piston over the casing slot relative to the speed of said second governor, and cradle means slidably holding said oil valve casing and secured to said transmission housing.

5. The device of claim 4 wherein the cradle means comprise a cradle housing having a base, a pair of T-bars secured to the cradle base, a co-acting pair of guideways adapted to engage said T-bars and secured to the bottom of the transmission housing and cable means for selectively moving the cradle housing to effect closure of the oil valve slot.

6. The device of claim 5 wherein the synchronizing drums comprise a plurality of quadrant interlocked sections, each of said sections having mating tongue and grooves adapted to mate with an adjacent section, means for holding said sections to said gears and spring means for returning said sections from a centrifugal force position back to normal position upon stopping the rotation of the co-acting gear.

References Cited in the file of this patent
UNITED STATES PATENTS

| | | |
|---|---|---|
| 2,016,643 | Lowndes | Oct. 8, 1935 |
| 2,044,930 | Zubaty | June 23, 1936 |
| 2,655,056 | Clintsman | Oct. 13, 1953 |

FOREIGN PATENTS

| | | |
|---|---|---|
| 56,219 | France | June 25, 1952 |
| | (1st addition to 1,001,213) | |